United States Patent
Matsuo

(10) Patent No.: US 7,035,398 B2
(45) Date of Patent: *Apr. 25, 2006

(54) ECHO CANCELLATION PROCESSING SYSTEM

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 493 days.

This patent is subject to a terminal disclaimer.

(21) Appl. No.: 10/078,441

(22) Filed: Feb. 21, 2002

(65) Prior Publication Data

US 2003/0039353 A1 Feb. 27, 2003

(30) Foreign Application Priority Data

Aug. 13, 2001 (JP) ............................. 2001-245686

(51) Int. Cl.
*H04M 9/08* (2006.01)

(52) U.S. Cl. ..................... 379/406.06; 379/406.02; 379/406.08

(58) Field of Classification Search .......... 379/406.01, 379/406.03, 406.06, 406.08, 406.09, 406.02; 579/406.1; 387/93, 66, 94.1, 92, 91; 381/122

See application file for complete search history.

(56) References Cited

U.S. PATENT DOCUMENTS

| 6,317,501 | B1 | 11/2001 | Matsuo | |
| 6,404,886 | B1 * | 6/2002 | Yoshida et al. | ........ 379/406.01 |
| 2002/0041693 | A1 * | 4/2002 | Matsuo | ........................ 381/93 |
| 2002/0080980 | A1 * | 6/2002 | Matsuo | ........................ 381/92 |
| 2002/0106092 | A1 * | 8/2002 | Matsuo | ........................ 381/92 |

FOREIGN PATENT DOCUMENTS

| JP | 1-215130 | 8/1989 |
| JP | 5-252079 | 9/1993 |
| JP | 7-240722 | 9/1995 |
| JP | 7-250397 | 9/1995 |
| JP | 9-8707 | 1/1997 |
| JP | 11-18194 | 1/1999 |
| JP | 2001-144655 | 5/2001 |

OTHER PUBLICATIONS

Office Action of the corresponding Japanese Application No. 2001-245686.
Office Action mailed Jun. 7, 2005 for Japanese Patent Application No. 2001-245686 citing JP 3-113923; USP 4,998,241 corresponding to JP 3-113923, the examiner referring to col. 5, lines 9-16 of USP 4,998,241.

* cited by examiner

Primary Examiner—Jefferey F. Harold
(74) Attorney, Agent, or Firm—Staas & Halsey LLP

(57) ABSTRACT

A wraparound delay amount detecting part calculates a cross-correlation r(k) from an output speech signal "$a_i$" supplied to a loudspeaker and an input speech sigal "$b_i$" inputted through a microphone array to obtain a delay amount "d" of a wraparound speech signal. The delay processing part generates a speech signal "$a_{i-d}$" obtained by delaying the output speech signal "$a_i$" by the delay amount "d". Even if there is a change in delay amount due to the variation in environment, appropriate delay processing can be conducted by the delay processing part. In an adaptive filter, an estimated wraparound speech signal $a_{i-d}$' is generate from the speech signal "$a_{i-d}$" subject to delay processing. A subtracter subtracts the estimated wraparound speech signal $a_{i-d}$' from the input speech signal "$b_i$" to generate an echo cancellation signal "$e_i$". A coefficient updating part updates the coefficient of the adaptive filter.

19 Claims, 10 Drawing Sheets

ECHO CANCELLATION PROCESSING SYSTEM

BACKGROUND OF THE INVENTION

1. Field of the Invention

The present invention relates to an echo cancellation processing system applied to a full duplex telephony system.

2. Description of the Related Art

Various services using the Internet start being provided along with the widespread use of the Internet, and a so-called computer telephony system using a technique of VoIP (Voice over Internet Protocol) or the like via the Internet is becoming widespread. Hereinafter, a conventional full duplex telephony system using a VoIP application via the Internet will be described.

FIG. 9 schematically shows a fill duplex telephony system. In FIG. 9, references numerals 510 and 520 denote speakers. For convenience, the case will be described where the speaker 520 utters a speech, which is transmitted to the speaker (communication partner) 510. Reference numerals 511 and 521 denote microphones, 512 and 522 denote loudspeakers, 513 and 523 denote VoIP applications, 514 and 524 denote terminal apparatuses, and 530 denotes the Internet. A communication interface, and other devices are not shown for convenience of description.

When the speaker 520 inputs a speech to the microphone 521, the VoIP application 523 receives the speech and conducts required processing such as sampling, whereby the speech is sent from the terminal apparatus 524 to the Internet 530 as packet data. Each packet data follows routing on the Internet to reach the terminal apparatus 514. Then, each packet data is assembled in a correct order, and subjected to required processing in the VoIP application 513. Thereafter, the packet data is outputted from the loudspeaker 512 as a speech signal.

Herein, it is conventionally known that a phenomenon called an echo occurs. While the speech outputted from the loudspeaker 512 reaches the speaker 510, it may be inputted to the microphone 511 as a speech due to wraparound. In this case, the speech inputted to the microphone 511 is transmitted via the VoIP application 513 of the terminal apparatus 514, the Internet 530 and the VoIP application 523 of the terminal apparatus 524, and outputted as a speech containing an echo from the loudspeaker 522, thereby forming a kind of loop. A transmission delay is caused in a path (echo path) forming a loop that causes the echo. More specifically, the speaker 520 hears his/her speech, which has been inputted to the microphone 521, from the loudspeaker 522 after a slight delay. It is known that in the case where such an echo is caused, the speaker has difficulty in hearing a speech of a communication partner, as well as in speaking. Furthermore, in the case where the level of an echo is very high, and the echo diffuses without being attenuated, a telephone conversation becomes disabled due to a phenomenon called howling.

In order to solve the above-mentioned problem, an echo canceller is conventionally used. FIG. 10 schematically shows an echo cancellation processing system using an echo canceller in the prior art. In FIG. 10, the terminal apparatus 514 on the speaker 510 side has an echo canceller 515. The echo canceller 515 captures a signal to be outputted through the loudspeaker 512, and removes the captured signal component from a signal captured through the microphone 511, thereby canceling a speech signal inputted to the microphone 511 due to wraparound.

The echo canceller 515 includes an adaptive filter, a coefficient updating part, and a subtracter. The adaptive filter generates an estimated signal in accordance with the amount of an echo speech signal that is outputted from the loudspeaker 512 and wraps around to the microphone 511. The subtracter subtracts an estimated signal component generated by the adaptive filter from an input speech signal obtained through the microphone 511. If a wraparound speech signal component contained in the input speech signal is exactly subtracted in the subtracter, an echo can be completely deleted.

Herein, the prior art is predicated under the following conditions: the influence of a relative positional relationship between the loudspeaker 512 and the microphone 511 and a surrounding environment upon an echo is known. Furthermore, the delay amount of a speech signal wrapping around to the microphone 511 from the loudspeaker 512 is considered to be constant, and the coefficient of the adaptive filter is set so as to substantially correspond to the delay amount and surrounding environment determined based on the known information. However, the delay amount and surrounding environment are not always invariable, and an initial setting is not necessarily optimum, so that the coefficient updating part is provided. The coefficient updating part feeds back the result of echo cancellation processing, and updates the coefficient of the adaptive filter at a predetermined timing.

However, the echo cancellation processing system using the conventional echo canceller has the following problems.

First, in the conventional echo canceller, when an environment around a speaker is varied largely, echo cancellation processing cannot be adjusted immediately in accordance with the variation.

The conventional echo canceller is effective under the following conditions: a relative positional relationship between the loudspeaker 512 and the microphone 511 is constant, a variation in environment at a place where a speaker system is disposed is small enough, and a change in delay amount of a speech signal that wraps around to the microphone 511 from the loudspeaker 512 is small. Therefore, in the case where these preconditions are not satisfied, and a variation in environment is large (e.g., in the case where the conditions of sound reflection from a wall and a ceiling are varied, in the case where the relative positional relationship between the loudspeaker and the microphone due to the movement of the loudspeaker or the microphone is changed largely, etc.), a change in delay amount of a speech signal that wraps around to the microphone from the loudspeaker is large, and such a large change cannot be immediately cancelled by updating the coefficient of the adaptive filter in the coefficient updating part of the conventional echo cancellation processing system.

Second, due to the presence of a noise source, an echo cancellation effect is likely to decrease.

In order to enhance the performance of an echo canceller, it is important to capture a speech output signal of the loudspeaker to be inputted to the microphone with good sensitivity. However, the conventional echo canceller is likely to be influenced by a noise source such as a speaker's speech and a background sound in an environment. In the case where there is such a noise source, an estimation precision of a speech output signal of the loudspeaker to be inputted to the microphone is lowered, and the parameter updating amount of the adaptive filter in the coefficient updating part does not become appropriate, which decreases the performance of echo cancellation processing.

Third, according to the conventional echo cancellation processing system, in the case where echo cancellation processing is not sufficient, the quality of telephone conversation decreases.

According to the conventional echo cancellation processing system, even in the case where echo cancellation processing is not sufficient, echo cancellation processing is continued, and a residual signal after the echo cancellation processing is also sent to a system on the communication partner side. Thus, a residual signal is always sent to a speaker system as a background noise, which degrades the quality of telephone conversation.

SUMMARY OF THE INVENTION

Therefore, with the foregoing in mind, it is an object of the present invention to provide an echo cancellation processing system capable of estimating a delay amount of a speech signal that wraps around to a microphone from a loudspeaker with a high precision, appropriately updating the coefficient of an adaptive filter, and maintaining the performance of echo cancellation processing at a high level, even in the case where the delay amount is changed largely due to a variation in environment (e.g., in the case where the conditions of sound reflection from a wall and a ceiling are varied, in the case where the relative positional relationship between the loudspeaker and the microphone is changed largely, etc.).

It is another object of the present invention to provide an echo cancellation processing system capable of maintaining an estimation precision of a speech output signal of a loudspeaker to be inputted to a microphone at a high level, and making a parameter update amount of an adaptive filter by a coefficient updating part appropriate.

It is still another object of the present invention to avoid the quality deterioration of telephone conversation by preventing a residual signal after echo cancellation processing from being sent to a system on the communication partner side in the case where echo cancellation processing is not sufficient.

In order to achieve the above-mentioned object, the echo cancellation processing system of the present invention includes in a full duplex telephony system: a microphone array; a loudspeaker for converting a speech signal transmitted from a telephony system on a communication partner side to a speech; and an echo cancellation processing part including an estimated wraparound speech signal generating part for estimating a speech signal that is outputted from the loudspeaker and wraps around to the microphone array, using an input speech signal through the microphone array, and generating an estimated wraparound speech signal in accordance with an estimated result based on an output speech signal supplied to the loudspeaker, and a subtracter for subtracting the estimated wraparound speech signal from an input speech signal inputted through the microphone array.

Because of the above configuration, even in the case where there is a large change in delay amount of a speech signal that wraps around to a microphone from a loudspeaker due to the variation in environment, a wraparound speech signal and its delay amount are analyzed and estimated with a high precision by using a microphone array, whereby the coefficient of an adaptive filter can be updated appropriately.

Furthermore, it is preferable that the echo cancellation processing system of the present invention further includes: a wraparound delay amount detecting part for comparing an output speech signal supplied to the loudspeaker with a wraparound speech signal contained in an input speech signal inputted through the microphone array, and detecting a delay amount of the wraparound speech signal contained in the input speech signal delayed from the output speech signal; and a delay processing part for delaying the output speech signal in accordance with the delay amount detected by the wraparound delay amount detecting part, wherein an output speech signal of the delay processing part is the output speech signal inputted to the estimated wraparound speech signal generating part.

Because of the above-mentioned configuration, a delay amount of a wraparound speech signal is detected by a delay detecting part, and delay processing of an output signal is conducted in a delay processing part, so that a phase difference between the wraparound speech signal and the output signal can be decreased. In the prior art, a change in delay amount is also compensated by coefficient update processing conducted by a coefficient update unit. However, according to the present invention, due to a delay processing part, a load of the coefficient update unit can be reduced, and even in the case where there is large change in delay amount caused by the variation in environment and the like, the phase difference between both the signals can be decreased with a high precision at a high speed, whereby echo cancellation processing can be conducted.

Since a microphone array is used, a wraparound speech signal is emphasized and extracted from signals contained in each input speech signal by synchronous addition processing. A wraparound speech signal can be obtained with a high precision, so that the accuracy of calculation of a delay amount can be enhanced, which improves the performance of echo cancellation processing.

Similarly, due to the synchronous addition processing using a microphone array, a speaker's speech signal can be emphasized and extracted among signals contained in each input speech signal. Since a speaker's speech signal is obtained with a high precision, the speaker's speech signal can be emphasized and sent to a telephony system on a communication partner side, which relatively improves the performance of echo cancellation processing.

Next, in the above-mentioned echo cancellation processing system, it is preferable that the estimated wraparound speech signal generating part includes an adaptive filter, and a coefficient updating part for updating a coefficient of the adaptive filter at a predetermined timing, wherein the coefficient updating part determines the estimated result and a coefficient update amount of the adaptive filter based on a level of a wraparound speech signal remaining in an echo cancellation result obtained by the echo cancellation processing part, and the adaptive filter conducts the adaptation based on an output speech signal supplied to the loudspeaker, and generates the estimated wraparound speech signal.

In the case where sound sources in a number larger than the number of loudspeakers are detected by a sound source number detecting part for detecting the number of sound sources in the surrounding of the microphone array based on input speech signals inputted through each microphone constituting a microphone array, the update of the coefficient of an adaptive filter in the coefficient updating part is made slow or suspended.

Because of the above-mentioned configuration, in the case where there is a speech from a sound source other than a loudspeaker, the update of a coefficient can be made slow or suspended, whereby the performance of echo cancellation processing is enhanced. The reasons for this are as follows.

The coefficient of the adaptive filter needs to be determined so as to cancel only wraparound of a speech signal from a loudspeaker to a microphone. When the coefficient is determined and updated under the condition that there is an input of a speech signal to a microphone from another sound source, the performance of echo cancellation is degraded.

Next, the echo cancellation processing system of the present invention further includes: a speech signal switch provided in an output stage of the echo cancellation processing part; a speech signal switch control part for controlling on/off of the speech signal switch; a speaker's speech detecting part for detecting presence/absence of a speaker's speech based on input speech signals inputted through each microphone constituting the microphone array; a first power calculating part for calculating a power of an output speech signal supplied to the loudspeaker; and a second power calculating part for calculating a power of a speech signal outputted from the echo cancellation processing part, wherein the speech signal switch control part brings the speech signal switch into an ON-state when the speaker's speech detecting part detects a speaker's speech and brings the speech signal switch into an OFF-state when the speaker's speech detecting part does not detect a speaker's speech, in a case where a value obtained by the first power calculating part is equal to or more than a predetermined value, and a value obtained by the second power calculating part is equal to or more than a predetermined value, and the speech signal switch control part brings the speech signal into an ON-state, in a case where a value obtained by the first power calculating part is equal to or more than a predetermined value, and a value obtained by the second power calculating part is less than the predetermined value.

Because of the above-mentioned configuration, in the case where an echo cancellation processing effect is not correctly exhibited, a speech signal can be sent by switching only at a time of an input of a speaker's speech, and the quality of a telephone conversation can be maintained. More specifically, in the case where the power of a residual speech signal is large at an output of an echo cancellation processing part in the absence of an input through a microphone, some offset value to be a background noise remains. Therefore, in the absence of an input of a speaker's speech, it is preferable to bring an output signal of the echo cancellation processing part into an OFF-state, rather than keeping it in an ON-state.

These and other advantages of the present invention will become apparent to those skilled in the art upon reading and understanding the following detailed description with reference to the accompanying figures.

DESCRIPTION OF THE PREFERRED EMBODIMENTS

An echo cancellation processing system of the present invention will be described with reference to the drawings.

Embodiment 1

An echo cancellation processing system of Embodiment 1 according to the present invention includes a wraparound delay amount detecting part for detecting a delay amount of a wraparound speech signal so as to estimate a wraparound speech signal, and a delay processing part for delaying an output speech signal in accordance with the delay amount detected in the wraparound delay amount detecting part, and inputs a loudspeaker output signal to an estimated wraparound speech signal generating part after subjecting the loudspeaker output signal to delay processing. Even if a delay amount of a wraparound speech is changed due to the change in relative positional relationship between a loudspeaker and a microphone and the variation in environment, after a loudspeaker output signal is subjected to delay processing in the delay processing part, the coefficient of an adaptive filter in the estimated wraparound speech signal generating part is updated. Therefore, the load of coefficient updating processing can be reduced, and the precision thereof can be enhanced.

Figure 1:
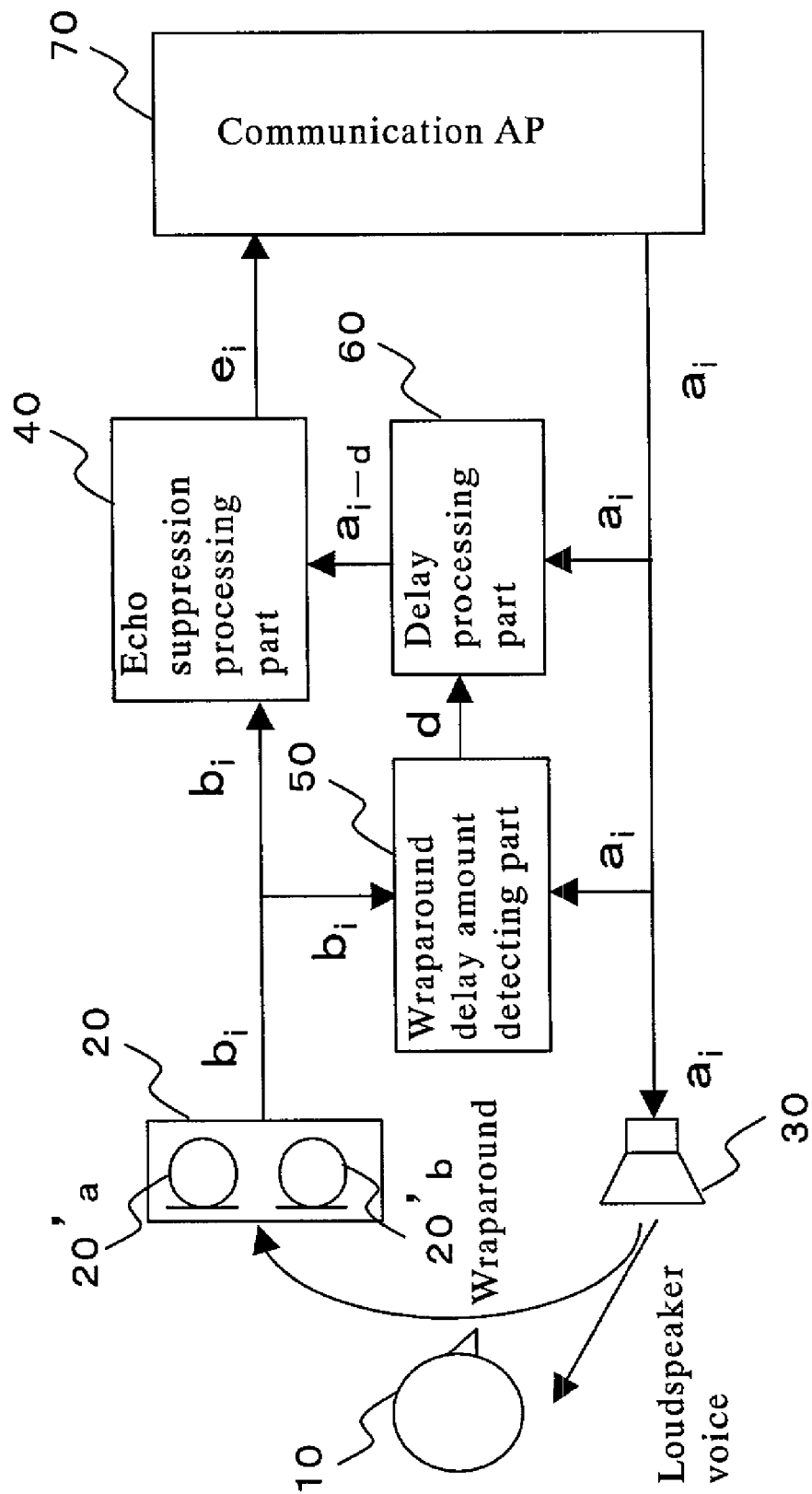
FIG. 1 is a block diagram showing a configuration of an echo cancellation processing system of Embodiment 1 according to the present invention.

FIG. 1 is a block diagram schematically showing the echo cancellation processing system of Embodiment 1 according to the present invention. In FIG. 1, reference numeral 10 denotes a speaker, 20'*a* and 20'*b* denote microphones, 30 denotes a loudspeaker, 40 denotes an echo cancellation processing part, 50 denotes a wraparound delay amount detecting part, 60 denotes a delay processing part, and 70 denotes a communication application (communication AP).

In this example, it is assumed that a speech signal on a communication partner side outputted from the loudspeaker 30 wraps around to the microphones 20'*a* and 20'*b*, and an echo caused by the wraparound speech signal is cancelled on the near end side (i.e., on the side where wraparound occurs).

In FIG. 1, a communication path on the right side of the communication AP 70 and a telephony system on the communication partner side are not shown. A communication interface and other devices are not shown for convenience of description.

The microphones 20'*a* and 20'*b* convert an inputted speech to a speech signal with a predetermined sampling frequency. The microphones 20'*a* and 20'*b* constitute an array, and the number of microphones may be two or more.

The loudspeaker 30 converts a speech signal transmitted from the telephony system on the communication partner side to a speech by changing the speech signal to a mechanical vibration of a vibration plate.

The echo cancellation processing part 40 generates an estimated signal of a wraparound speech, and subtracts the estimated signal from an input speech signal inputted via the microphones 20'a and 20'b to cancel an echo component contained in the input speech signal, thereby canceling an echo phenomenon.

Figure 2:
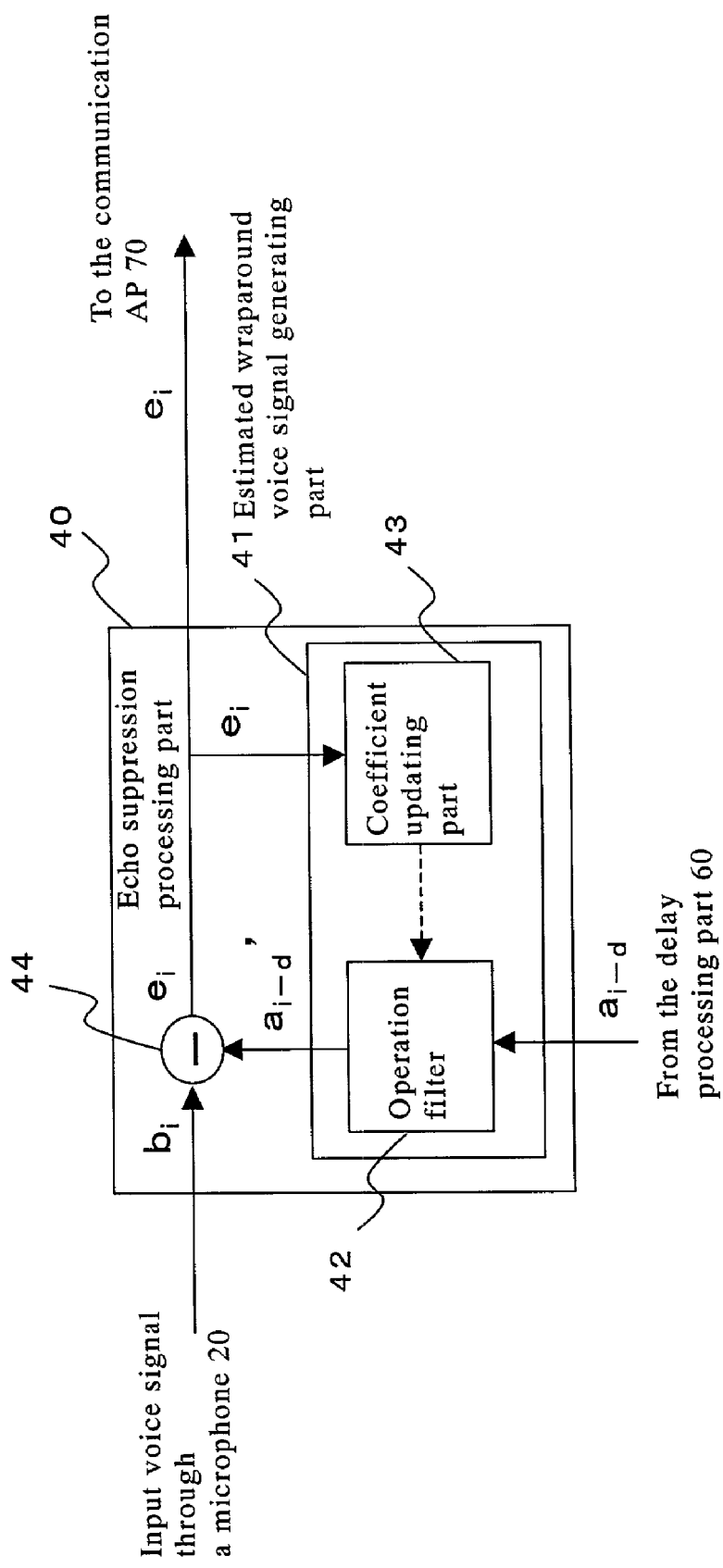
FIG. 2 is a block diagram showing a configuration of a module in an echo cancellation processing part.

FIG. 2 is a block diagram showing a configuration of a module in the echo cancellation processing part 40.

The echo cancellation processing part 40 includes an estimated wraparound speech signal generating part 41, an adaptive filter 42, a coefficient updating part 43, and a subtracter 44. In Embodiment 1, the estimated wraparound speech signal generating part 41 includes the adaptive filter 42 and the coefficient updating part 43.

The estimated wraparound speech signal generating part 41 estimates a wraparound speech signal that is outputted from the loudspeaker 30 and wraps around to the microphones 20'a and 20'b, and generate an estimated wraparound speech signal in accordance with the estimated result based on an output speech signal to be supplied to the loudspeaker 30.

Herein, the adaptive filter 42 receives an output speech signal to be supplied to the loudspeaker 30 to conduct adaptation, and outputs an estimated wraparound speech signal as an adaptation result. In this example, the adaptive filter 42 is assumed as a finite impulse-response (FIR) filter. An example of adaptation by the FIR filter will be described later.

The coefficient updating part 43 updates the coefficient of the adaptive filter at a predetermined timing. The coefficient updating part 43 determines a coefficient update amount of the adaptive filter 42 so that the level of a wraparound speech signal that is a residual echo component in the result of echo cancellation becomes minimum, and updates the coefficient. In this example, it is assumed that the coefficient of the adaptive filter that is an FIR filter is updated using the normalized least-mean-square algorithm (NLMS algorithm). An example of a coefficient update by the NLMS algorithm will be described later.

The subtracter 44 receives an input speech signal inputted to the microphones 20'a and 20'b, and an estimated wraparound speech signal generated by the adaptive filter 42. The subtracter 44 subtracts the latter signal (i.e., the estimated wraparound speech signal) from the former signal (i.e., the input speech signal). Thus, the echo cancellation processing part 40 cancels a wraparound speech signal component contained in an input speech signal by subtraction processing in the subtracter 44, thereby canceling an echo.

The wraparound delay amount detecting part 50 detects a delay amount of a speech signal that wraps around from the loudspeaker 30 to the microphone 20. The wraparound delay amount detecting part 50 receives an output speech signal supplied to the loudspeaker 30 and an input speech signal inputted to the microphones 20'a and 20'b, and compares the speech signals with each other, thereby detecting a delay amount of a wraparound speech signal contained in the input speech signal with respect to the output speech signal.

The delay processing part 60 delays an output speech signal in accordance with the delay amount detected by the wraparound delay amount detecting part 50. A delayed speech signal obtained by delaying an output speech signal by the delay processing part 60 is inputted to the estimated wraparound speech signal generating part 41.

Thus, a wraparound delay amount is processed by the delay processing part 60, instead of the adaptive filter 42 of the estimated wraparound speech signal generating part 41. Therefore, an adaptation processing load of the adaptive filter 42 can be reduced.

Furthermore, in the case where there is a variation in environment such as the movement of the loudspeaker 30 or the microphones 20'a and 20'b, and a change in reflection conditions of a wall, a delay change component of a wraparound speech signal is absorbed by detection of the change in delay amount by the wraparound delay amount detecting part 50 and adjustment of a delay amount by the delay processing part 60. Therefore, a coefficient update processing load of the adaptive filter 42 depending upon the coefficient updating part 43 can be reduced, and a delay change of a wraparound speech signal can be handled with a high precision at a high speed.

The communication AP 70 controls communication, and also controls a communication protocol. In the case where a communication path is the Internet, the communication AP 70 becomes a VoIP application.

Figure 3:
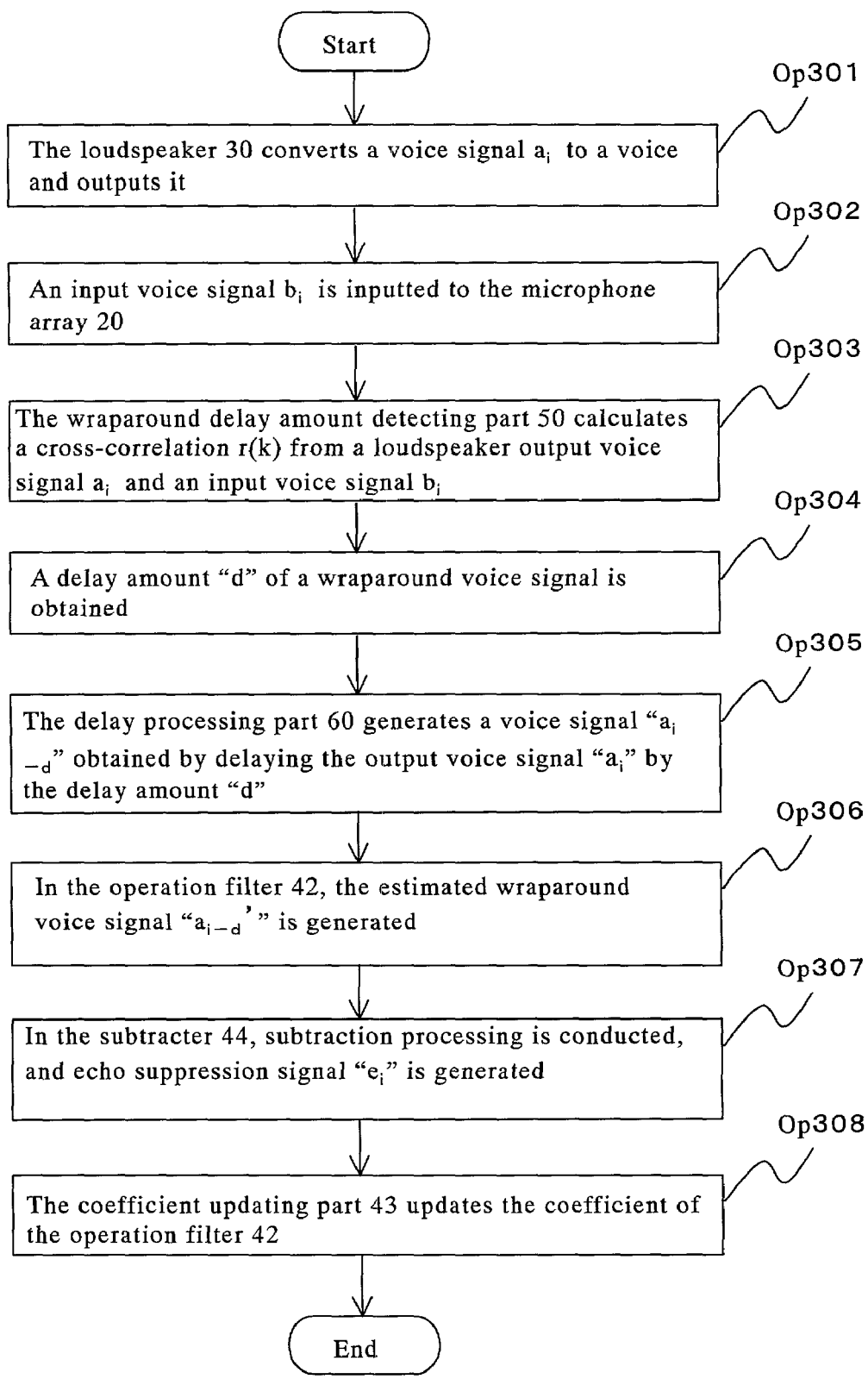
FIG. 3 is a flow chart showing a flow of speech signal processing by the echo cancellation processing system of Embodiment 1 according to the present invention.

Hereinafter, a flow of speech signal processing in the echo cancellation processing system of Embodiment 1 according to the present invention will be described with reference to a flow chart in FIG. 3.

In FIG. 1, "$a_i$" represents an output speech signal on a communication partner side, which is given from the communication AP 70 to the loudspeaker 30. The loudspeaker 30 converts the output speech signal "$a_i$" to a speech and outputs it (Operation 301). The suffix "i" represents a sampling number of sequential data.

The output speech signal "$a_i$" with respect to the loudspeaker 30 is also captured by the wraparound delay amount detecting part 50 and the delay processing part 60 for later processing.

Then, the speaker 10 hears the speech outputted from the loudspeaker 30, while the speech wraps around to the microphones 20'a and 20'b due to sound diffraction, thereby becoming a part of an input signal of the microphone 20. An input speech signal from the microphones 20'a and 20'b is denoted with "$b_i$" (Operation 302).

The input speech signal "$b_i$" from the microphones 20'a and 20'b are inputted to the wraparound delay amount detecting part 50 and the echo cancellation processing part 40.

The wraparound delay amount detecting part 50 receives the output speech signal "$a_i$" supplied to the loudspeaker 30 and the input speech signal "$b_i$" inputted through the microphones 20'a and 20'b. The wraparound delay amount detecting part 50 calculates a cross-correlation r(k) from the output speech signal "$a_i$" and the input speech signal "$b_i$" by using Expression 1. Herein, n' represents an order of a cross-correlation, and "k" represents an integer of 0 or more (Operation 303).

$$r(k) = \sum_{j=0}^{n'-1} a_{i-j} b_{i-j+k} \qquad (1)$$

"k" when the cross-correlation r(k) becomes maximum is searched for, thereby obtaining a delay amount "d" of a wraparound speech signal (Operation 304).

The delay amount (delay sample number) "d" is given from the wraparound delay amount detecting part 50 to the delay processing part 60, and the delay processing amount is set. The delay processing part 60 receives the output speech signal "$a_i$" supplied to the loudspeaker 30, and a speech signal "$a_{i-d}$" delayed by "d" from the speech signal "$a_i$" is generated (Operation 305).

The speech signal "$a_{i-d}$" of the delay processing part 60 is given to the adaptive filter 42 of the estimated wraparound speech signal generating part 41 of the echo cancellation processing part 40. As shown in FIG. 2, the adaptive filter 42 receives the speech signal "$a_{i-d}$", and conducts adaptation shown in Expression 2 in accordance with the currently set coefficient, and an estimated wraparound speech signal $a_{i-d}'$ is generated (Operation 306).

$$a'_{i-d} = \sum_{j=0}^{n-1} h_j a_{i-d-j} \quad (2)$$

where j represents a filter coefficient number of a coefficient h of the adaptive filter.

Next, the subtracter 44 receives the input speech signal "$b_i$" inputted through the microphones 20'a and 20'b and the estimated wraparound speech signal $a_{i-d}'$. The subtracter 44 conducts subtraction of both the signals as shown in Expression 3, thereby canceling an estimated wraparound speech signal component from the input signal to generate an echo cancellation signal "$e_i$". Thus, echo cancellation processing is conducted (Operation 307).

$$e_i = b_i - a_{i-d}' \quad (3)$$

The echo cancellation signal is sent through a communication path via the communication AP 70 as an output signal from the echo cancellation processing system and given to a telephony system on the communication partner side.

Next, the coefficient updating part 43 updates the coefficient of the adaptive filter 42 (Operation 308). In this example, the NLMS algorithm is used, and the coefficient is updated in accordance with Expression 4.

$$h_j = h_j + \alpha \cdot e_i \frac{a_{i-d-j}}{\|a\|^2} \quad (4)$$

where $$\|a\|^2 = \sum_{j=0}^{n-1} a_{i-d-j}^2$$

where α is a constant, and generally satisfies 0.0<α<2.0.

Based on the updated coefficient "$h_j$", the subsequent adaptation is conducted.

In the above-mentioned example, even in the case where there is a variation in environment such as the movement of the loudspeaker 30, the movement of the microphone 20, and the change in reflection conditions of a wall or the like, and the delay amount "d" is changed to "$d_1$", the delay amount "$d_1$" is obtained by the wraparound delay amount detecting part 50, and a speech signal "$a_{i-d1}$" delayed by the delay amount "$d_1$" is generated by the delay processing part 60. Therefore, a change in the coefficient $h_j$ of the adaptive filter 42 becomes small, and the calculation load of the coefficient updating part 43 becomes small.

Because of the above-mentioned signal processing, delay processing of a wraparound speech caused by a variation in environment is conducted in a delay processing part, whereby the load of coefficient update processing can be reduced and the precision thereof can be enhanced.

Embodiment 2

The echo cancellation processing system of Embodiment 2 according to the present invention uses a microphone array as a microphone. In this system, a wraparound speech signal that wraps around to a microphone array from a loudspeaker is estimated with a high precision by synchronous addition, and an estimated wraparound speech signal component is subtracted from an input speech signal of the microphone array to cancel an echo. Furthermore, a speaker's speech is emphasized by synchronous addition to enhance the quality of telephone conversation.

It is assumed that a plurality of microphones are disposed at a predetermined position, and the distance between the respective microphones and the angle thereof are known.

The echo cancellation processing system of Embodiment 2 according to the present invention will be described in a configuration combined with the configuration using the estimated wraparound speech signal generating part and the delay processing part described in Embodiment 1.

Figure 4:
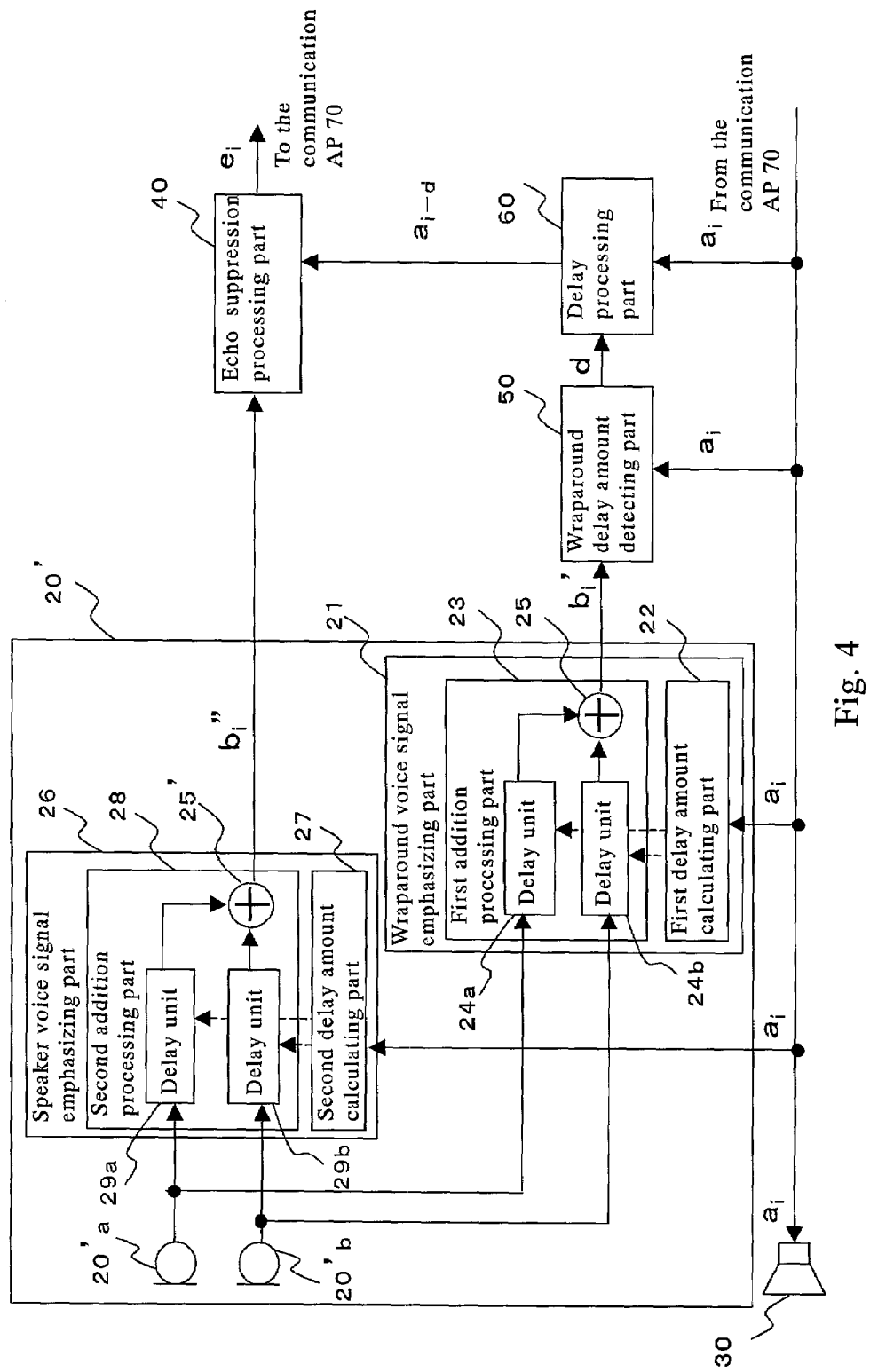
FIG. 4 is a block diagram showing a configuration of an echo cancellation processing system of Embodiment 2 according to the present invention.

FIG. 4 is a block diagram showing a configuration of the echo cancellation processing system of Embodiment 2 according to the present invention.

In FIG. 4, reference numeral 20' denotes a microphone array. The microphone array 20' includes two microphones 20'a and 20'b in this example. The microphone array 20' also includes a wraparound speech signal emphasizing part 21 and a speaker's speech signal emphasizing part 26.

The wraparound speech signal emphasizing part 21 emphasizes and extracts a wraparound speech signal among input speech signals inputted through the microphones 20'a and 20'b. The wraparound speech signal emphasizing part 21 includes a first delay amount calculating part 22 for calculating a delay amount between the loudspeaker and the microphone and a first addition processing part 23. Furthermore, the first addition processing part 23 includes two delay units 24a and 24b and an adder 25.

The first delay amount calculating part 22 calculates a cross-correlation between the input speech signals inputted through the respective microphones 20'a and 20'b in the case where the power of a loudspeaker output signal "$a_i$" is equal to or more than a predetermined value, and calculates a delay amount between the loudspeaker 30 and each microphone from the calculation result of cross-correlation. More specifically, since the distance between the loudspeaker 30 and the microphone 20'a is different from that between the loudspeaker 30 and the microphone 20'b, the delay amounts of the input speech signals of the respective microphones 20'a and 20'b of the loudspeaker output speech signal are also varied. The first delay amount calculating part 22 calculates a delay amount for the respective microphones 20'a and 20'b.

The delay units 24a and 24b of the first addition processing part 23 correspond to the microphones 20'a and 20'b, respectively. The delay amount A of the respective delay units 24a and 24b is set to be the delay amount of the respective microphones 20'a and 20'b calculated by the first delay amount calculating part 22. Due to the delay processing, phases of the loudspeaker output speech signals inputted through the microphones 20'a and 20'b are matched with each other.

The adder 25 adds up two loudspeaker output speech signals that are inputted through the microphones 20'a and 20'b and subjected to delay processing by the delay units 24a and 24b. As described above, two wraparound speech signals have their delay amounts adjusted and are in the same phase. Therefore, synchronous addition processing is conducted, and a wraparound speech signal from the loudspeaker 30 is emphasized.

As shown in FIG. 4, a wraparound speech signal emphasized by the synchronous addition processing of the wraparound speech signal emphasizing part 21 is $b_i'$. The wraparound signal $b_i'$ is inputted to the wraparound delay amount detecting part 50.

Each processing in the wraparound delay amount detecting part 50, the delay processing part 60, and the echo cancellation processing part 40 after the wraparound signal $b_i'$ is inputted to the wraparound delay amount detecting part 50 is the same as that in Embodiment 1. The description thereof will be omitted here.

The speaker's speech signal emphasizing part 26 conducts synchronous addition processing of a speaker's speech signal among the input speech signals inputted through the microphones 20'a and 20'b, and emphasizes the speaker's speech signal.

The speaker's speech signal emphasizing part 26 includes a second delay amount calculating part 27 and a second addition processing part 28. The second addition processing part 28 includes delay units 29a, 29b, and an adder 25'.

The second delay amount calculating part 27 for calculating a delay amount between the speaker and the microphone calculates a cross-correlation between the input speech signals inputted through the respective microphones 20'a and 20'b from a speaker in the case where the power of the loudspeaker output signal "$a_i$" is equal to or less than a predetermined value, and calculates a delay amount between the speaker and each microphone from the calculation result of the cross-correlation. More specifically, the distance between the speaker 10 and the microphone 20'a is different from that between the speaker 10 and the microphone 20'b. Therefore, the delay amounts of the input speech signals of the respective microphones 20'a and 20'b of the speaker's speech signal are also varied. The second delay amount calculating part 27 calculates the delay amount for the respective microphones 20'a and 20'b.

The delay units 29a and 29b of the second addition processing part 28 correspond to the microphones 20'a and 20'b, respectively. The delay amount of the respective delay units 29a and 29b is set to be the delay amount of the respective microphones 20'a and 20'b calculated by the second delay amount calculating part 27. Due to the delay processing, phases of the speaker's speech signals inputted through the microphones 20'a and 20'b are matched with each other.

The adder 25' adds up two speaker's speech signals that are inputted through the microphones 20'a and 20'b and subjected to delay processing by the delay units 29a and 29b. As described above, two speaker's speech signals have their delay amounts adjusted and are in the same phase. Therefore, synchronous addition processing is conducted, and a speech signal from the speaker 10 is emphasized.

As shown in FIG. 4, a speaker's speech signal emphasized by the synchronous addition processing by the speaker's speech signal emphasizing part 26 is $b_i''$. The speaker's speech signal $b_i''$ is inputted to the wraparound delay amount detecting part 50.

Each processing in the echo cancellation processing part 40 after the speaker's speech signal $b_i''$ is inputted to the echo cancellation processing part 40 is the same as that in Embodiment 1. The description thereof will be omitted here.

As described above, the echo cancellation processing system of Embodiment 2 according to the present invention uses a microphone array as a microphone. In this system, a wraparound speech signal that wraps around to a microphone array from a loudspeaker is estimated with a high precision by synchronous addition, and an estimated wraparound speech signal component is subtracted from the input speech signal of the microphone array, whereby an echo can be cancelled. Furthermore, a speaker's speech is emphasized by synchronous addition, whereby the quality of telephone conversation can be enhanced.

Embodiment 3

In the echo cancellation processing system of Embodiment 3, a coefficient update function of an adaptive filter is performed only in the case where only a wraparound signal of a loudspeaker output speech signal is inputted.

Ideally, the echo cancellation processing cancels only a wraparound signal component of a loudspeaker output speech signal. More specifically, the coefficient update function of the adaptive filter is ideally conducted under the condition that only a wraparound signal of a loudspeaker output speech signal is inputted through a microphone, and there is no input of a speech signal from another sound source, as well as a speaker's speech.

The echo cancellation processing system of Embodiment 3 terminates the coefficient update function of the adaptive filter in the case where either of the following two conditions is satisfied. The first condition is that the number of sound sources present in the surrounding of the microphone exceeds the number of loudspeakers. The second condition is that the power of the loudspeaker output speech signal is equal to or less than a predetermined level (i.e., there is no output of a speech signal sufficient for wrapping around to the microphone from the loudspeaker).

The case where the first condition is satisfied corresponds to the case where a speaker's speech and a speech signal from another sound source are present, in addition to a loudspeaker output speech signal. Therefore, the coefficient update function of the adaptive filter is terminated. The case where the second condition is satisfied corresponds to the case where a loudspeaker output speech signal is small enough, a speech signal wrapping around to a microphone from a loudspeaker is small enough, and an input speech signal of the microphone is a speaker's speech or a signal from another sound source. Therefore, the coefficient update function of the adaptive filter is terminated.

Figure 5:
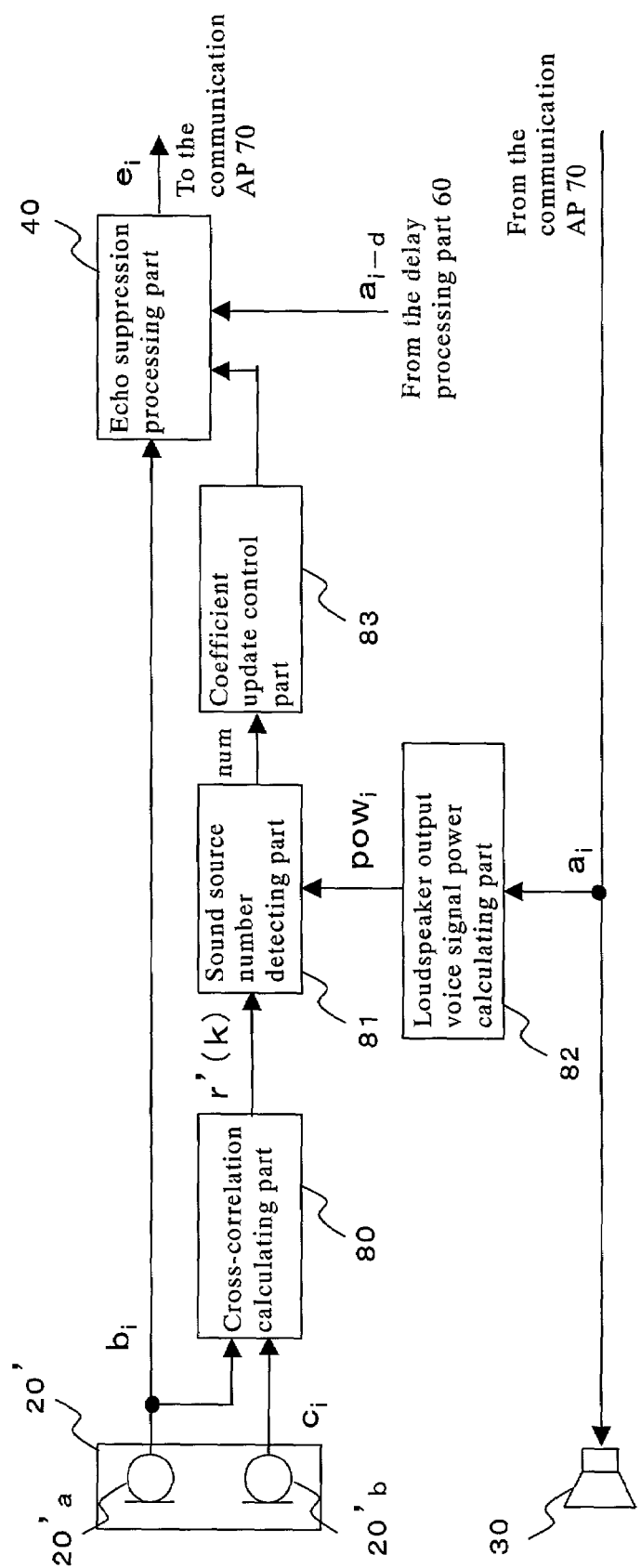
FIG. 5 is a block diagram showing a configuration of an echo cancellation processing system of Embodiment 3 according to the present invention.

FIG. 5 is a block diagram showing a configuration of the echo cancellation processing system of Embodiment 3 according to the present invention.

In FIG. 5, reference numeral 80 denotes a cross-correlation calculating part, 81 denotes a sound source number detecting part, 82 denotes a loudspeaker output speech signal power calculating part, and 83 denotes a coefficient update control part. In this example, the microphone array 20' includes microphones 20'a and 20'b. The configurations of the loudspeaker 30 and the echo cancellation processing part 40 may be the same as that of Embodiment 1, and are briefly shown in the figure.

The cross-correlation calculating part 80 calculates a cross-correlation between input speech signals inputted through each microphone constituting the microphone array.

The sound source number detecting part 81 detects the number of sound sources in the surrounding of the microphone array from the calculation result of cross-correlation by the cross-correlation calculating part 80.

The loudspeaker output speech signal power calculating part 82 calculates the power of a loudspeaker output speech signal, thereby determining whether or not there is an output large enough for becoming a wraparound speech signal with respect to the microphone array 20.

The coefficient update control part 83 terminates the function of the coefficient updating part 43 (not shown in FIG. 5) of the echo cancellation processing part 40, in the case of detecting that either of the two conditions for terminating the coefficient update function of the adaptive filter described above is satisfied.

Next, a flow of the speech signal processing will be described.

First, a speech signal is inputted through the microphones 20'$a$ and 20'$b$ of the microphone array 20'. It is assumed that theses input speech signals are "$b_i$" and "$c_i$".

The loudspeaker output speech signal power is calculated by using the following Expression 6. In the case where the power "$pow_i$" is equal to or more than a predetermined value (i.e., in the case where the loudspeaker outputs a speech, the following processing is conducted).

The cross-correlation calculating part 80 calculates a cross-correlation r'(k) obtained by normalizing two input speech signals with "$b_i$" and "$c_i$" in accordance with the following Expression 5.

$$r'(k) = \frac{\sum_{j=0}^{n'-1} b_{i-j} c_{i-j+k}}{\|b\| \|c\|} \quad (5)$$

where $$\|b\| = \sqrt{\sum_{j=0}^{n'-1} b_{i-j}^2}$$

$$\|c\| = \sqrt{\sum_{j=0}^{n'-1} c_{i-j+k}^2}$$

The absolute value of the cross-correlation r'(k) is $-1.0 \leq r'(k) \leq 1.0$.

Figure 6:
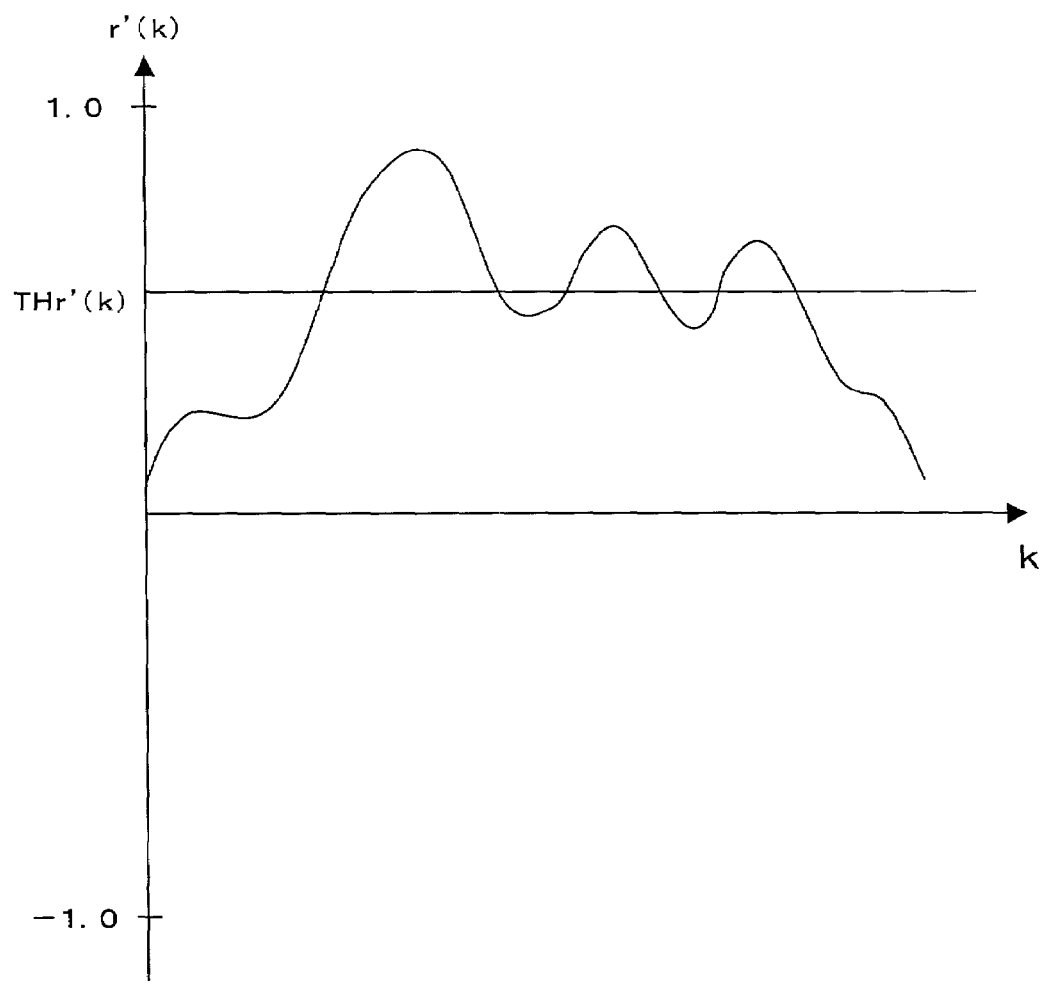
FIG. 6 shows an exemplary distribution in the case where a vertical axis represents a value of a cross-correlation r'(k), and a horizontal axis represents a relative position with respect to two microphones.

FIG. 6 shows an exemplary distribution in the case where a vertical axis represents a value of a cross-correlation r'(k), and a horizontal axis represents a relative position with respect to two microphones. In FIG. 6, a predetermined value THr'(k) at which an appropriate threshold value is obtained is shown. In the example shown in FIG. 6, three peaks exceeding the predetermined value are seen. More specifically, it is determined that there are three sound sources of signals inputted to the microphone array in the surrounding of the microphone array.

The sound source number detecting part 81 outputs the detected number "num" of sound sources to the coefficient update control part 83.

When determining that the above-mentioned first condition that sound sources are present in the surrounding of the microphone array in a larger number than that of the loudspeakers is satisfied, the coefficient update control part 83 terminates the coefficient update function of the adaptive filter 42 by the coefficient updating part 43.

Furthermore, the loudspeaker output speech signal power calculating part 82 calculates the power "$pow_i$" of an output speech signal supplied to the loudspeaker 30 in accordance with the following Expression 6.

$$pow_i = \sum_{j=0}^{n'-1} a_{i-j}^2 \quad (6)$$

In the case where the value of the power "$pow_i$" is equal to or less than a predetermined value, a loudspeaker output speech signal is small enough, and a wraparound speech signal that wraps around to the microphone array is small enough. Therefore, if the coefficient update function of the adaptive filter 42 is conducted by the coefficient updating part 43, the coefficient of the adaptive filter 42 is updated inappropriately. The coefficient update control part 83 determines that the above-mentioned second condition is satisfied, and terminates the coefficient update function of the coefficient updating part 43.

As described above, the echo cancellation processing system of Embodiment 3 is capable of conducting the coefficient update function of an adaptive filter only in the case where only a wraparound signal of a loudspeaker output speech signal is inputted to a microphone.

Embodiment 4

The echo cancellation processing system of Embodiment 4 has a speech switching function. When an echo cancellation effect by the echo cancellation processing part is not obtained sufficiently, a residual echo remains in an echo cancellation signal. When it is detected that the level of the residual echo is high, in order to maintain the speech quality of a telephone conversation, the speech switching function is conducted. More specifically, an output speech signal is sent to the communication AP only in the case where there is a speaker's speech input. In the case where there is no speaker's speech input, the output speech signal is not given to the communication AP.

Figure 7:
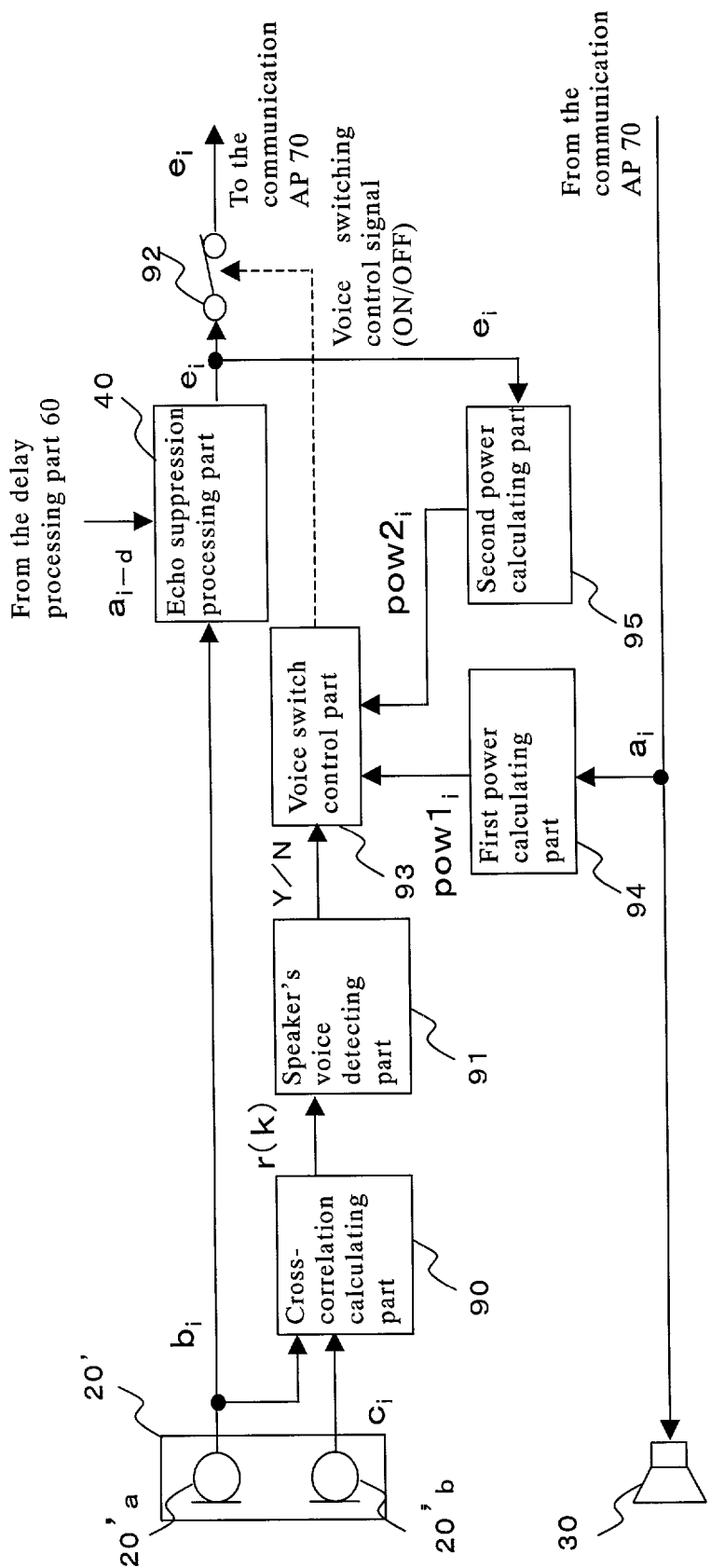
FIG. 7 is a block diagram showing a configuration of an echo cancellation processing system of Embodiment 4 according to the present invention.

FIG. 7 is a block diagram showing a configuration of the echo cancellation processing system of Embodiment 4 according to the present invention.

In FIG. 7, reference numeral 90 denotes a cross-correlation calculating part, 91 denotes a speaker's speech detecting part, 92 denotes a speech switch, 93 denotes a speech switch control part, 94 denotes a first power calculating part, and 95 denotes a second power calculating part. In FIG. 7, the loudspeaker 30, the echo cancellation processing part 40, and the communication AP 70 are the same as those described in Embodiment 1. Furthermore, the microphone array 20' may or may not include the wraparound speech signal emphasizing part 21 and the speaker's speech signal emphasizing part 26 as described in Embodiment 2. In the case where the microphone array 20' is not provided with the wraparound speech signal emphasizing part 21 and the speaker's speech signal emphasizing part 26, the input speech signal "$b_i$" becomes a speech signal inputted through the microphone 20'$a$, and the input speech signal "$c_i$" becomes a speech signal inputted through the microphone 20'$b$. Furthermore, in the case where the microphone array 20' is provided with the wraparound speech signal emphasizing part 21 and the speaker's speech signal emphasizing part 26, the input speech signal "$b_i$" becomes a speaker's speech signal "$b_i$" emphasized by the speaker's speech signal emphasizing part 26, and the input speech signal "$c_i$" becomes a wraparound speech signal $b_i'$ emphasized by the wraparound speech signal emphasizing part 21.

The cross-correlation calculating part 90 calculates a cross-correlation r(k) between the input speech signals "$b_i$" and "$c_i$" inputted through each microphone constituting the microphone array 20'.

The speaker's speech detecting part 91 checks the magnitude of the cross-correlation in the surrounding of the microphone array 20' from the calculation result of the cross-correlation calculating part 90 and detects the presence/absence of a speaker's speech. Herein, if it is assumed that the speaker is positioned at the front of the microphone array 20', when a peak of a cross-correlation is detected in the front direction of the microphone array 20', it is determined that there is a speaker's speech input. The detection result (Y/N) is given to the speech switch control part 93.

The speech switch 92 is a speech signal switch provided in an output stage of the echo cancellation processing part 40, and the ON/OFF state thereof is switched by the control of the speech switch control part 93. In the case where the speech switch 92 is in an "ON" state, an output signal of the echo cancellation processing part 40 (i.e., an input speech signal subjected to echo cancellation processing) is given to the communication AP 70 and passed to the system on the communication partner side on the network. In the case where the speech switch 92 is in an "OFF" state, an output signal of the echo cancellation processing part 40 is not output to the communication AP 70.

The speech switch control part 93 controls the ON/OFF of the speech switch 92. The speech switch control part 93 receives an output signal (Y/N) of the speaker's speech detecting part 91, an output signal ($pow_1$) of the first power calculating part 94, and an output signal ($pow_2$) of the second power calculating part 95, and outputs a speech switch control signal (ON/OFF) with respect to the speech switch 92.

The first power calculating part 94 calculates a power "$pow1_i$" of an output speech signal "$a_i$" supplied to the loudspeaker 30.

The second power calculating part 95 calculates a power "$pow2_i$" of a speech signal "$e_i$" that is an output of the echo cancellation processing part 40.

Hereinafter, the control by the speech switch control part 93 with respect to the speech switch 92 will be described.

First, the speech switch control part 93 obtains a result (Y/N) regarding the presence/absence of a speaker's speech from the speaker's speech detecting part 91.

Then, the speech switch control part 93 checks whether or not the value "$pow1_i$" that is the calculation result of the first power calculating part 94 is equal to or more than a predetermined value. The predetermined value is set to such a degree that the magnitude of the output speech signal of the loudspeaker 30 is large enough to cause wraparound to the microphone array 20'.

The speech switch control part 93 also checks whether or not the value "$pow2_i$" that is the calculation result of the second power calculating part 95 is equal to or more than a predetermined value. The predetermined value is set to such a degree that it can be determined that a residual speech signal after echo cancellation processing is large, and the effect of echo cancellation processing has not been exhibited.

In the case where the value obtained in the first power calculating part is equal to or more than a predetermined value and the value obtained in the second power calculating part is equal to or more than another predetermined value, the speech switch control part 93 brings the speech switch 92 into an ON-state when the speaker's speech detecting part 91 detects a speaker's speech, whereas the speech switch control part 93 brings the speech switch 92 into an OFF-state when the speaker's speech detecting part 91 does not detect a speaker's speech. In this case, the output speech signal from the loudspeaker 30 is large enough to cause wraparound to the microphone array 20, and the echo cancellation processing effect of the echo control processing part 40 is not exhibited well. Therefore, a residual echo is contained in the output speech signal of the echo cancellation processing part 40. If the output speech signal is given to the communication AP 70 as it is, the quality of a speech is decreased. Therefore, only when the speaker's speech detecting part 91 detects a speaker's speech (i.e., only when there is a speaker's speech input), the speech switch 92 is brought into an ON-state so that a speaker's speech is transmitted to the telephony system on the communication partner side. When the speaker's speech detecting part 91 does not detect a speaker's speech (i.e., when there is no speaker's speech input), the speech signal switch 92 is brought into an OFF-state so that the output speech signal is not given to the communication AP 70.

On the other hand, in the case where the value obtained in the first power calculating part is equal to or more than a predetermined value and the value obtained in the second power calculating part is less than another predetermined value, the speech switch 92 is brought into an ON-state. In this case, the echo cancellation processing effect of the echo cancellation processing part 40 has been exhibited well. Therefore, the output speech signal of the echo cancellation processing part 40 is given to the communication AP 70 as it is.

As described above, the echo cancellation processing system of Embodiment 4 uses a speech switching function in which, in the case where an echo cancellation effect of the echo cancellation processing part has not been sufficiently obtained, an output speech signal is transmitted to a communication AP only when there is a speaker's speech input, and an output speech signal is not transmitted to a communication AP when there is no speaker's speech input, thereby maintaining the quality of a telephone conversation.

Embodiment 5

Figure 8:
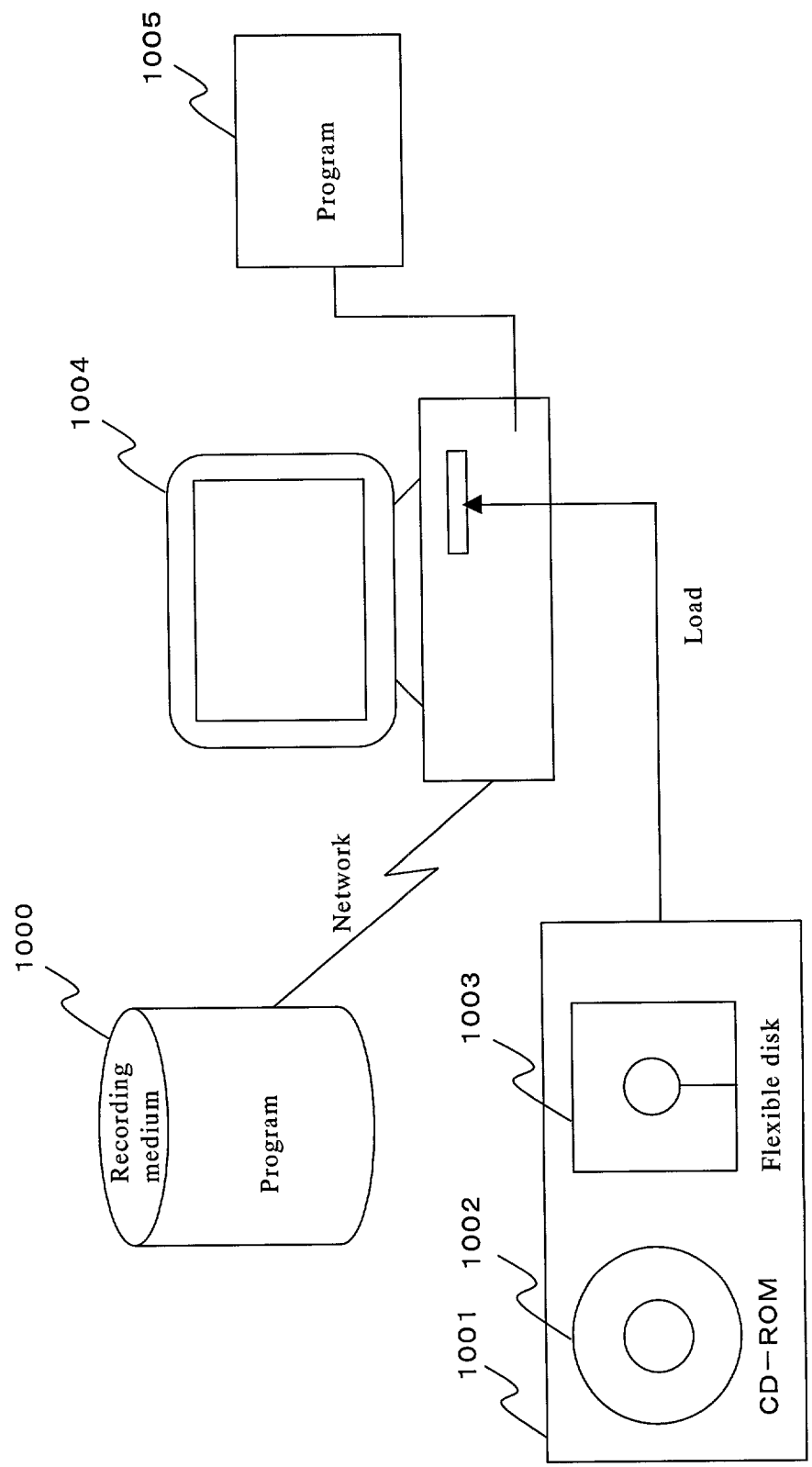
FIG. 8 shows examples of a recording medium storing an echo cancellation processing program of Embodiment 5 according to the present invention.
Figure 9:
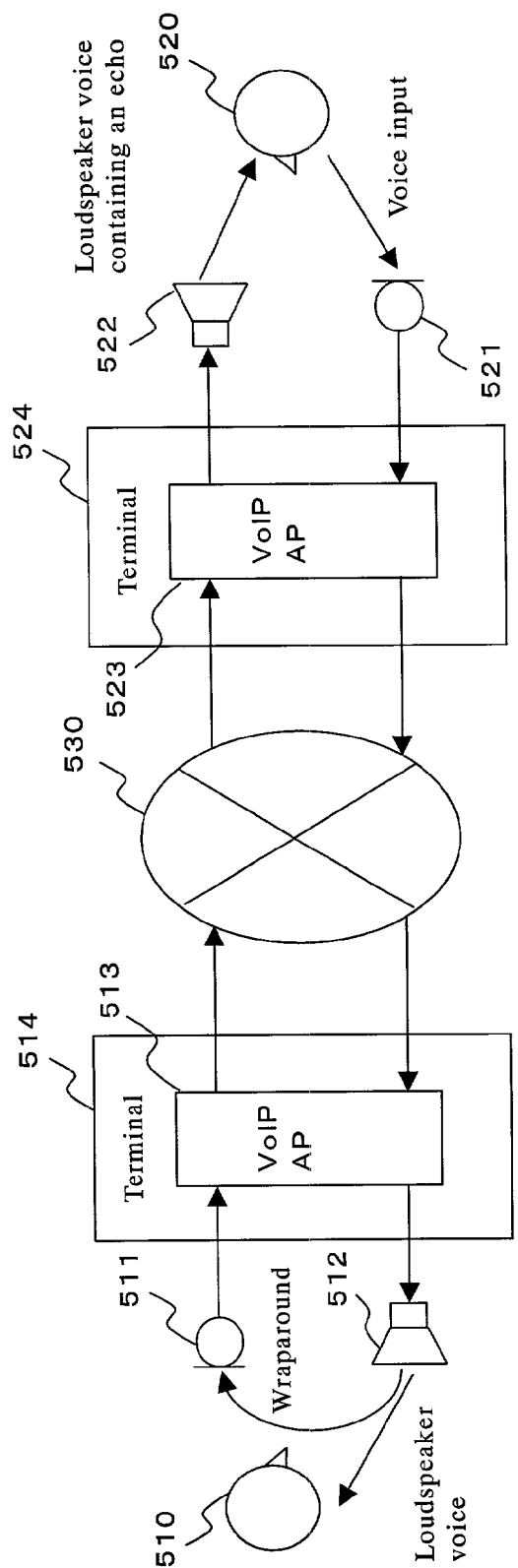
FIG. 9 schematically shows a full duplex telephony system in the prior art.
Figure 10:
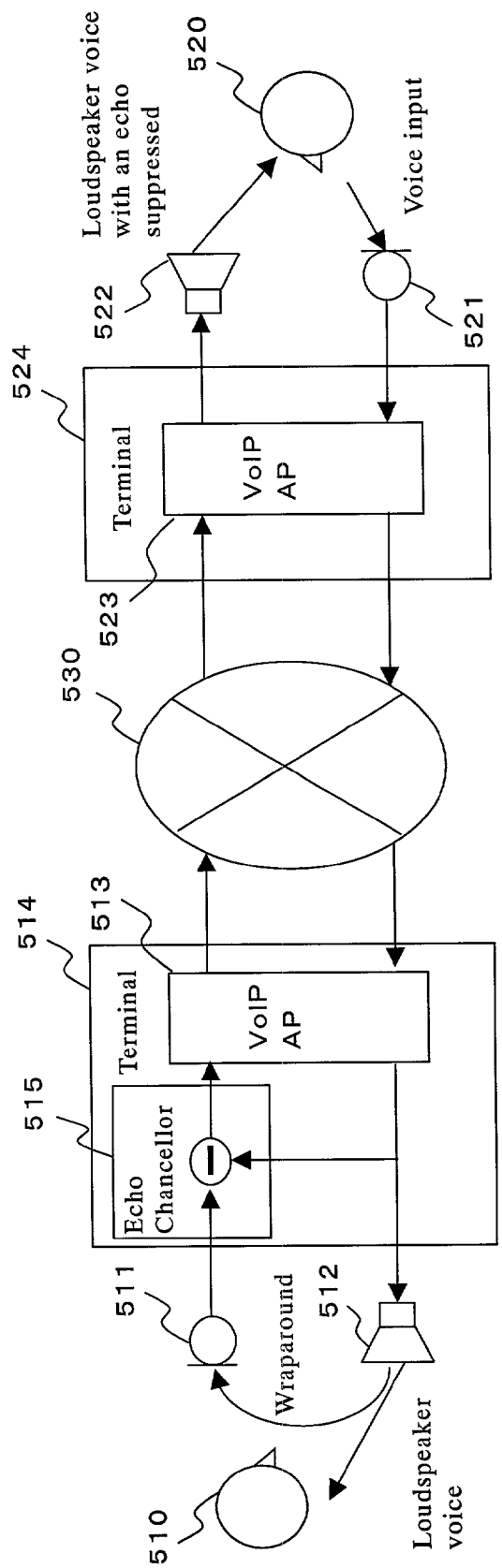
FIG. 10 schematically shows an echo cancellation processing system using an echo canceller in the prior art.

The echo cancellation processing system of the present invention can be configured using various computers by storing a program describing processing operations for realizing the above-mentioned constitution on a computer-readable recording medium. Examples of the recording medium storing a program including processing operations for realizing the echo cancellation processing system of the present invention include a recording medium 1000 in a recording apparatus on a network and a recording medium 1005 such as a hard disk and a RAM of a computer, as well as a portable recording medium 301 such as a CD-ROM 1002 and a flexible disk 1003, as shown in FIG. 8. In execution, the program is loaded onto a computer 1004, and executed on a main memory.

In the above-mentioned description, a microphone array may be replaced by a plurality of microphones. It should be understood that in the echo cancellation processing system of the present invention, the method and apparatus may be variously modified and altered without departing from the concept of the present invention. Therefore, it should be noted that the present invention is not limited to the above-mentioned embodiments.

According to the echo cancellation processing system of the present invention, a delay amount of a wraparound speech signal is detected in a delay detecting part, and delay processing of an output signal is executed in the delay processing part. Therefore, the phase difference between the wraparound speech signal and the output signal can be decreased. Because of the delay processing part, a load of a coefficient updating part can be reduced, and even in the case where there is a large change in delay amount due to the variation in environment, the phase of the wraparound speech signal is matched with that of the output signal with a high precision at a high speed, whereby echo cancellation processing can be executed.

According to the echo cancellation processing system of the present invention, even in the case where there is a large change in delay amount of a speech signal that wraps around to a microphone from a loudspeaker due to the variation in environment, the wraparound speech signal and the delay amount thereof can be analyzed and estimated with a high precision using a microphone array, whereby the coefficient of an adaptive filter can be updated appropriately.

Furthermore, according to the echo cancellation processing system of the present invention, in the case where a speech is generated from a sound source other than a loudspeaker, the update of a coefficient can be terminated, and the performance of echo cancellation processing can be enhanced.

Furthermore, according to the echo cancellation processing system of the present invention, in the case where an echo cancellation processing effect is not correctly exhibited, a speech signal can be transmitted by switching only at a time of a speaker's speech input, whereby the quality of a telephone conversation can be maintained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An echo cancellation processing system in a full duplex telephony system comprising:
    a microphone array;
    a loudspeaker converting a speech signal transmitted from a telephony system on a communication partner side to a speech;
    an echo cancellation processing part comprising:
        an estimated wraparound speech signal generating part estimating a speech signal that is outputted from the loudspeaker and wraps around to the microphone array, using a time difference or a level difference between input speech signals of a plurality of channels of the microphone array, and generate an estimated wraparound speech signal in accordance with an estimated result based on an output speech signal supplied to the loudspeaker, comprising:
            an adaptive filter, and
            a coefficient updating part updating a coefficient of the adaptive filter at a predetermined timing,
        wherein the coefficient updating part determines the estimated result and a coefficient update amount of the adaptive filter based on a level of a wraparound speech signal remaining in an echo cancellation result obtained by the echo cancellation processing part, and the adaptive filter conducts the adaptation based on an output speech signal supplied to the loudspeaker and generates the estimated wraparound speech signal,
        a subtracter subtracting the estimated wraparound speech signal from an input speech signal inputted to the microphone array; and
        a loudspeaker output speech signal power calculating part calculating a power of an output speech signal supplied to the loudspeaker,
    wherein in a case where a power with a predetermined value or more is not detected by the loudspeaker output speech signal power calculating part, a coefficient update of the adaptive filter by the coefficient updating part of the estimated wraparound speech signal generating part is made slow or suspended.

2. An echo cancellation processing system according to claim 1, further comprising:
    a wraparound delay amount detecting part for comparing an output speech signal supplied to the loudspeaker with a wraparound speech signal contained in an input speech signal inputted through the microphone array, and detecting a delay amount of the wraparound speech signal contained in the input speech signal delayed from the output speech signal; and
    a delay processing part for delaying the output speech signal in accordance with the delay amount detected by the wraparound delay amount detecting part,
    wherein an output speech signal of the delay processing part is inputted to the estimated wraparound speech signal generating part as an input signal.

3. An echo cancellation processing system according to claim 2, further comprising a wraparound speech signal emphasizing part for emphasizing and extracting the wraparound speech signal from the input speech signal,
    wherein the wraparound speech signal emphasizing part comprises:
        a first delay amount calculating part for calculating a delay amount between the respective microphone input signals delayed from the loudspeaker based on input speech signals inputted through each microphone constituting the microphone array; and
        a first addition processing part for conducting synchronous addition processing regarding an input speech signal inputted through each microphone constituting the microphone array, by adjusting the delay amount between the respective microphone input signals delayed from the loudspeaker, and emphasizing the wraparound speech signal, and the emphasized wraparound speech signal is inputted to the wraparound delay amount detecting part.

4. An echo cancellation processing system according to claim 3, wherein the first addition processing part comprises:
    a delay unit for adjusting the delay amount between the respective microphone input signals delayed from the loudspeaker corresponding to each microphone constituting the microphone array; and
    an adder whose input signal is an output signal of the delay unit through each microphone.

5. An echo cancellation processing system according to claim 4, further comprising a speaker's speech signal emphasizing part for conducting synchronous addition processing of a speaker's speech signal inputted through each microphone constituting the microphone array, and emphasizing the speaker's speech signal, thereby generating an input speech signal in which a speaker signal is emphasized.

6. An echo cancellation processing system according to claim 5, wherein the speaker's speech signal emphasizing part comprises:

a second delay amount calculating part for calculating a delay amount between respective microphone input signals delayed from the speaker based on input speech signals inputted through each microphone constituting the microphone array; and a second addition processing part for executing synchronous addition processing regarding an input speech signal inputted through each microphone constituting the microphone array, by adjusting the delay amount between the respective microphone input signals delayed from the speaker, and emphasizing the speaker's speech signal.

7. An echo cancellation processing system according to claim 6, wherein the second addition processing part comprises:

a delay unit for adjusting the delay amount between the microphone input signals delayed from the speaker corresponding to each microphone constituting the microphone array; and an adder whose input signal is an output signal of the delay unit through each microphone.

8. An echo cancellation processing system according to claim 3, further comprising a speaker's speech signal emphasizing part for conducting synchronous addition processing of a speaker's speech signal inputted through each microphone constituting the microphone array, and emphasizing the speaker's speech signal, thereby generating an input speech signal in which a speaker signal is emphasized.

9. An echo cancellation processing system according to claim 8, wherein the speaker's speech signal emphasizing part comprises:

a second delay amount calculating part for calculating a delay amount between respective microphone input signals delayed from the speaker based on input speech signals inputted through each microphone constituting the microphone array; and a second addition processing part for executing synchronous addition processing regarding an input speech signal inputted through each microphone constituting the microphone array, by adjusting the delay amount between the respective microphone input signals delayed from the speaker, and emphasizing the speaker's speech signal.

10. An echo cancellation processing system according to claim 9, wherein the second addition processing part comprises:

a delay unit for adjusting the delay amount between the microphone input signals delayed from the speaker corresponding to each microphone constituting the microphone array; and an adder whose input signal is an output signal of the delay unit through each microphone.

11. An echo cancellation processing system according to claim 2, further comprising a speaker's speech signal emphasizing part for conducting synchronous addition processing of a speaker's speech signal inputted through each microphone constituting the microphone array, and emphasizing the speaker's speech signal, thereby generating an input speech signal in which a speaker signal is emphasized.

12. An echo cancellation processing system according to claim 11, wherein the speaker's speech signal emphasizing part comprises:

a second delay amount calculating part for calculating a delay amount between respective microphone input signals delayed from the speaker based on input speech signals inputted through each microphone constituting the microphone array; and a second addition processing part for executing synchronous addition processing regarding an input speech signal inputted through each microphone constituting the microphone array, by adjusting the delay amount between the respective microphone input signals delayed from the speaker, and emphasizing the speaker's speech signal.

13. An echo cancellation processing system according to claim 12, wherein the second addition processing part comprises:

a delay unit for adjusting the delay amount between the microphone input signals delayed from the speaker corresponding to each microphone constituting the microphone array; and an adder whose input signal is an output signal of the delay unit through each microphone.

14. An echo cancellation processing system according to claim 1, further comprising a speaker's speech signal emphasizing part for conducting synchronous addition processing of a speaker's speech signal inputted through each microphone constituting the microphone array, and emphasizing the speaker's speech signal, thereby generating an input speech signal in which a speaker signal is emphasized.

15. An echo cancellation processing system according to claim 14, wherein the speaker's speech signal emphasizing part comprises:

a second delay amount calculating part for calculating a delay amount between respective microphone input signals delayed from the speaker based on input speech signals inputted through each microphone constituting the microphone array; and a second addition processing part for executing synchronous addition processing regarding an input speech signal inputted through each microphone constituting the microphone array, by adjusting the delay amount between the respective microphone input signals delayed from the speaker, and emphasizing the speaker's speech signal.

16. An echo cancellation processing system according to claim 15, wherein the second addition processing part comprises:

a delay unit for adjusting the delay amount between the microphone input signals delayed from the speaker corresponding to each microphone constituting the microphone array; and an adder whose input signal is an output signal of the delay unit through each microphone.

17. An echo cancellation processing system according to claim 1, further comprising a sound source number detecting part for detecting the number of sound sources in a surrounding of the microphone array based on input speech signals inputted through each microphone constituting the microphone array, wherein in a case where sound sources whose number exceeds the number of loudspeakers are detected by the sound source number detecting part, a coefficient update of the adaptive filter in the coefficient updating part is made slow or suspended.

18. An echo cancellation processing system according to claim 1, further comprising:

a speech signal switch provided in an output stage of the echo cancellation processing part;

a speech signal switch control part for controlling on/off of the speech signal switch;

a speaker's speech detecting part for detecting presence/absence of a speaker's speech based on input speech signals inputted through each microphone constituting the microphone array;

a first power calculating part for calculating a power of an output speech signal supplied to the loudspeaker; and a second power calculating part for calculating a power of a speech signal outputted from the echo cancellation processing part, wherein the speech signal switch control part brings the speech signal switch into an ON-state when the speaker's speech detecting part detects a speaker's speech and brings the speech signal switch into an OFF-state when the speaker's speech detecting part does not detect a speaker's speech, in a case where a value obtained by the first power calculating part is equal to or more than a predetermined value, and a value obtained by the second power calculating part is equal to or more than a predetermined value, and the speech signal switch control part brings the speech signal switch into an ON-state, in a case where a value obtained by the first power calculating part is equal to or more than a predetermined value, and a value obtained by the second power calculating part is less than the predetermined value.

19. A recording medium storing a processing program of a full duplex telephony system, the program comprising:

a processing operation of controlling a microphone array in which a plurality of microphones are disposed at predetermined positions;

a processing operation of controlling a loudspeaker for converting a speech signal transmitted from a telephony system on a communication partner side to a speech signal; and an echo cancellation processing operation comprising:

an estimated wraparound speech signal generation processing operation of estimating a speech signal that is outputted from the loudspeaker and wraps around to the microphone array, using an input speech signal of the microphone array, and generating an estimated wraparound speech signal in accordance with an estimated result based on an output speech signal supplied to the loudspeaker, and a subtraction processing operation of subtracting the estimated wraparound speech signal from an input speech signal inputted through the microphone array, wherein the estimated wraparound speech signal generation processing operation comprises a coefficient updating operation updating a coefficient of an adaptive filter at a predetermined timing, and determining the estimated result and a coefficient update amount of the adaptive filter based on a level of a wraparound speech signal remaining in an echo cancellation result obtained by the echo cancellation processing operation, and the adaptive filter conducts the adaptation based on an output speech signal supplied to the loudspeaker and generates the estimated wraparound speech signal; and a loudspeaker output speech signal power calculation processing operation of calculating a power of an output speech signal supplied to the loudspeaker, wherein in a case where a power with a predetermined value or more is not detected by the loudspeaker output speech signal power calculation processing operation, a coefficient update of the adaptive filter by the coefficient updating operation of the estimated wraparound speech signal generation processing operation is made slow or suspended.

\* \* \* \* \*

UNITED STATES PATENT AND TRADEMARK OFFICE
CERTIFICATE OF CORRECTION

| | |
|---|---|
| PATENT NO. | : 7,035,398 B2 |
| APPLICATION NO. | : 10/078441 |
| DATED | : April 25, 2006 |
| INVENTOR(S) | : Naoshi Matsuo |

It is certified that error appears in the above-identified patent and that said Letters Patent is hereby corrected as shown below:

On Title page (item 56)
Page 1, in col. 1 under References Cited, U.S. PATENT DOCUMENTS, before and above "6,317,501 B1 11/2001 Matsuo" insert --4,998,241 03/1991 Brox et al.--

On Title page (item 56)
Page 1, in col. 2 under References Cited, FOREIGN PATENT DOCUMENTS, after "JP 2001-144655 5/2001" insert --JP 3-113923 05/1991--

On Title page (item 57)
Page 1, in col. 2, line 11 of the ABSTRACT, delete "generate" and insert --generated--

On Title page (item 57)
Page 1, in col. 2, line 12 of the ABSTRACT, delete "subject" and insert --subjected--

Col. 17, line 42, after "system" insert --,--

Col. 18, line 15, after "part" delete "for"

Col 18, line 22, after "part" delete "for"

Signed and Sealed this

Twenty-third Day of January, 2007

JON W. DUDAS
*Director of the United States Patent and Trademark Office*